Oct. 28, 1969    W. E. DANJCZEK    3,475,103

STYLOGRAPHIC PEN CAP WITH BUILT-IN HYGROMETER

Filed Jan. 27, 1969

INVENTOR
WILLIAM E. DANJCZEK
BY *Semmes and Semmes*
ATTORNEYS

United States Patent Office 3,475,103
Patented Oct. 28, 1969

3,475,103
STYLOGRAPHIC PEN CAP WITH BUILT-IN HYGROMETER
William E. Danjczek, Easton, Pa., assignor to Rapidograph, Inc., Bloomsbury, N.J., a corporation of New Jersey
Filed Jan. 27, 1969, Ser. No. 794,085
Int. Cl. B43k 5/12
U.S. Cl. 401—194      10 Claims

ABSTRACT OF THE DISCLOSURE

A stylographic pen cap of the type including a moisture retaining means supported within a transparent end of the cap and a moisture indicating means supported against the transparent cap, so as to indicate the degree of moisturization within the pen cap environment.

BACKGROUND OF THE INVENTION

Field of the invention

Numerous previous inventors have addressed themselves to moisture indicating devices, particularly devices which would indicate the degree of moisture is cigarette lighter fuel reservoirs, refrigeration lines or jet fuel lines. Conventionally, a moisture indicating device such as cobaltous chloride may be employed, or any type of color changing material may be used.

In stylographic drafting instruments, moisture retaining devices are placed within the pen cap, so as to maintain the stylographic pen point within a humidified environment and avoid drying and caking of the ink with the resultant, deleterious clogging of the pen capillary ink channel. However, there is no prior teaching of a stylographic pen cap including a moisture retaining means used in combination with a moisture indicating means which would indicate the degree of moisturization in the pen cap.

Description of the prior art

Pertinent prior are includes: Lewis 2,605,634; Ahlgren 2,609,692; Blinn 2,716,338; Lockwood 2,951,461; Newcum 2,994,295; Klein 3,019,638; Wittlin 3,046,096; Nesh 3,106,836; Pappas 3,173,880; Nadolski 3,222,292.

The foregoing patents teach the employment of moisture indicating devices which are supported within a sealed environment to indicate exteriorly the degree of moisturization within the environment. Note in this respect the Lewis and Ahlgren patents which concern moisture indicating devices in cigarette lighters: Newcum, Wittlin, and Nesh which show the use of such devices in fluid lines such as refrigeration lines or jet engine fuel lines. Cobaltous chloride is widely used as a moisture indicating device as disclosed in Pappas. Note also, the Nadolski patent, assigned to American Cyanamid and concerning the detection of moisture in organic liquids.

Blinn shows the use of a button type package humidity indicator.

SUMMARY OF THE INVENTION

According to the present invention, a stylographic pen is provided with a transparent cap which complementally engages a stylographic pen point holder so as to support the drafting pen point inwardly of the cap within a sealed environment. Within the cap, a moisture retaining means, such as a sponge, is supported and a moisture indicating means is supported together with the moisture retaining means. One end of the cap is transparent, so that the pen user may determine the degree of moisturization within the cap at a glance. As the moisture indicating device indicates drying of the environment, additional moisture may be added to the moisture retaining sponge or the like.

DESCRIPTION OF THE PREFERRED EMBODIMENTS

Figure 1:
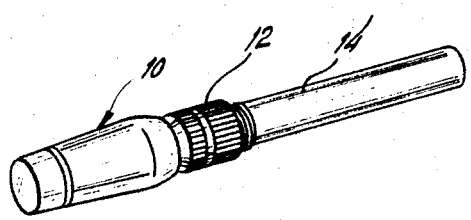
FIG. 1 is a perspective view, showing the stylographic pen cap secured to a drafting pen point holder and ink cartridge.

In FIG. 1, pen cap 10 is indicated as complementally engaging pen tip holder 12 to which is attached ink cartridge 14 of the conventional type.

Figures 2, 3:
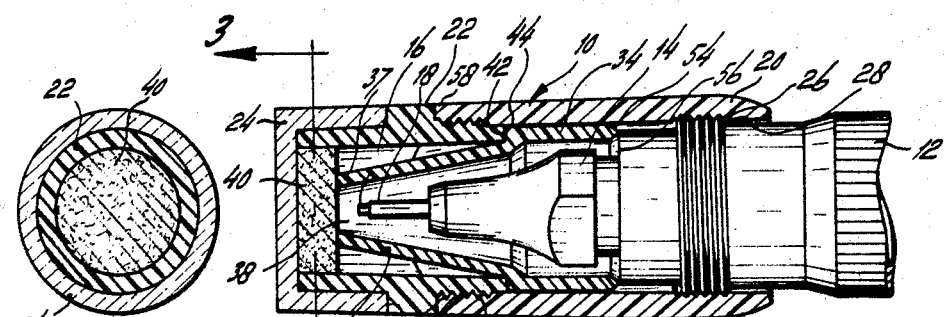
FIG. 2 is a longitudinal section, partially fragmentary, showing the drafting pen tip sealingly supported within the cap.
FIG. 3 is a cross section, taken along section line 3—3 of FIG. 2.

In FIG. 2, pen cap 10 is illustrated as further comprising transparent end cap 24, mid-section 22, and open end or bottom section 20 having inner threads 26, sealingly engaging the holder exterior threads 28. Mid-section 22 includes a peripheral flange 32 which at its forward end abuts one end of transparent cap 24 and its bottom abuts the end 58 of bottom section 20. Mid-section threads 30 engage corresponding threads 57 on the bottom section to secure bottom section 20 to mid-section 22. A sponge, or fibrous like moisture retaining material 40 containing, also, a moisture indicator, may be supported interiorly of the transparent end cap 24 and inwardly of mid-section 22. A plastic or like resilient cap liner 36 may be supported inwardly of bottom section 20 so that its cylindrical base 34 abuts the interior diameter of bottom section 20, while its upper shoulder 44 engages the end 42 of mid-portion 22. The front conical section 37 of the liner extends to abut the moisture retaining means 40 so as to define a sealed environment 38 surrounding cylindrical capillary pen tip 16 held in holder 18, in turn mounted in nib 14.

Sealing of cap 10 with respect to holder 12 is accomplished not only by means of complemental engagement of threads 26 and 28, but also by abutting relationship of the liner bottom end 54, complementally engaging inclined shoulder 56 of holder 12. This ensures a double seal of the environment.

Figure 4:
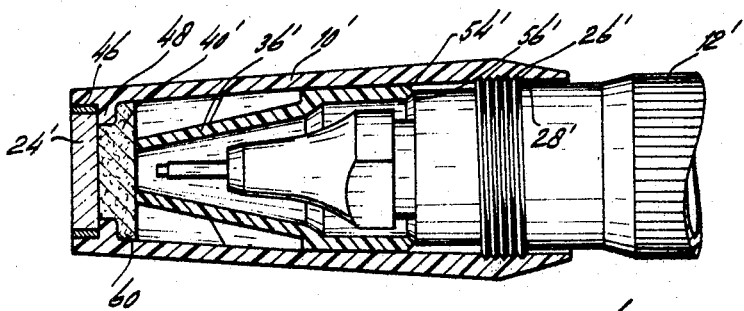
FIG. 4 is a like longitudinal sectional view, partially fragmentary, showing a modification of the pen cap arrangement.

A modification of invention is illustrated in FIG. 4, wherein the cap 10' is molded in a unitary piece, having an open end in which window 24' may be inserted and sealed by means of peripheral gasket 46, thermoplastic adhesive or the like. A single set of inner threads 26' in the cap 10' engage holder 12 corresponding threads 28' and, similarly, further sealing is effected by liner bottom end 54' shoulder complementally engaging shoulder 56'. According to this arrangement, the moisture retaining means 40' containing a moisture indicating means may be configured, so as to include bottom peripheral flange 60 which abuts cap inner annular shoulder 48. Shoulder 48 simultaneously serves to hold the window 24' in place.

Figure 5:
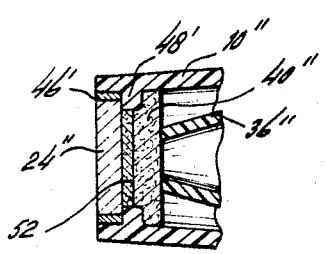
FIG. 5 is a like longitudinal sectional view partially fragmentary showing a further modification of the cap and end viewing window.

Yet, a further modification of invention is illustrated in FIG. 5 wherein a moisture indicating disc 52 is inserted intermediate the moisture retaining material 40" and the window 24". This moisture indicating disc 52 is held in place not only by window 24" and moisture retaining means 40", but also by the inner annular shoulder 48".

It is usually desired that color change, for example, from blue to pink, take place at 90 to 100% relative humidity. Sponge 40 may actually be impregnated with such a color indicating material, or, as illustrated in FIG. 5, a moisture indicating disc may be interposed between sponge and window. Blotting paper, sponge, cotton, cellulose fibers or the like, may be employed as the moisture retaining means.

As cap 10 is screwed on to holder 12, the double sealing action takes place, sealing the moisture replenished environment surrounding the pen point. This sealing allows the moisture to escape from the moisture holding medium and saturate the atmosphere around pen point. Use of the transparent window and the moisture indicating means in the cap avoids unintended drying out of the sponges and consequent caking of ink within the point and without the knowledge of the draftsman.

Manifestly, the cap may be varied in structure without departing from the spirit of the claims.

I claim:
1. A sylographic pen cap of the type complementally engageable with a stylographic pen point holder comprising:
   (A) a cylindrical housing, closed at one end and open at its other end to receive a stylographic pen point axially;
   (B) a transparent window at the closed end of said housing;
   (C) moisture retaining means supported within said housing interiorly adjacent to said window;
   (D) moisture indicating means supporting within said cap together with said moisture retaining means; and
   (E) sealing means mounted inwardly of said cap to engage said pen holder, so as to support the pen point in a closed environment adjacent said moisture retaining means.

2. A stylographic pen cap as in claim 1, including:
   (F) a resilient liner mounted interiorly of said housing so as to surround the pen point and extend from the pen point base conically toward said moisture retaining means, so as to reduce the sealed area communicant with said moisture retaining means.

3. A stylographic pen cap as in claim 2, said cylindrical housing including:
   (i) a transparent top cap seated exteriorly upon said cap as a window;
   (ii) a mid-portion fitted complementally within said cap at one end and including a peripheral flange abutting said cap; and
   (iii) a bottom portion threadedly engaging said mid-portion and abutting said peripheral flange, said bottom portion being adapted for circumferential engagement of said pen holder.

4. A stylographic pen cap as in claim 3, said inner liner abutting the bottom portion interior and an inclined shoulder of said pen point holder when positioned within said liner, and an inner shoulder of said mid-section, said liner extending conically towards said moisture retaining means.

5. A stylographic pen cap as in claim 2, said cap being of a unitary configuration and threaded at its open end to complementally engage threads on said holder and including:
   (G) a window inset in the closed end of said housing, so as to abut said moisture retaining means.

6. A stylographic pen cap as in claim 5, said window being peripherally sealed in said housing.

7. A stylographic pen cap as in claim 5, including a moisture indicating disc interposed between said moisture retaining means and said inset window.

8. A stylographic pen cap as in claim 2, said cap including two pressure points sealing said pen point within said cap, as follows:
   (i) a first pressure point where said cap interior threads engage said pen holder exterior threads;
   (ii) a second pressure point situated where said inner liner longitudinally abuts the shoulder of said pen point holder.

9. A stylographic pen cap as in claim 4, said inner lining being circumferentially inset within said cap so that the bottom end of said liner abuts a shoulder of said pen point holder.

10. A stylographic pen cap as in claim 9, said liner at its forward end as an open cone contacting said moisture retaining means.

References Cited
UNITED STATES PATENTS
| | | | |
|---|---|---|---|
| 2,605,634 | 8/1952 | Lewis | 73—73 |
| 2,951,461 | 9/1960 | Lockwood | 116—114 |
| 3,131,675 | 5/1964 | Wieszeck | 401—195 |

FOREIGN PATENTS
| | | |
|---|---|---|
| 524,648 | 8/1940 | Great Britain. |

LAWRENCE CHARLES, Primary Examiner

U.S. Cl. X.R.

73—73; 116—114; 401—195, 243, 258